United States Patent Office 3,183,158
Patented May 11, 1965

3,183,158
STEROIDS POSSESSING ANTI-PHLOGISTIC
ACTIVITIES
Klaus Brückner, Darmstadt-Eberstadt, Germany, assignor
to E. Merck Aktiengesellschaft, Darmstadt, Germany
No Drawing. Filed May 2, 1963, Ser. No. 277,461
Claims priority, application Germany, Dec. 24, 1962,
M 55,245
8 Claims. (Cl. 167—65)

The present invention relates to new and useful steroids of the pregnane series.

It is an object of this invention to provide novel compounds having valuable physiological activities, as well as compositions containing these compounds, together with pharmaceutically acceptable carriers.

It is a further object of this invention to provide a process for producing said compounds, as well as a method of administering them.

Upon further study of the specification and claims, other objects and advantages of the present invention will become apparent.

The new compounds of this invention include those represented by the formula

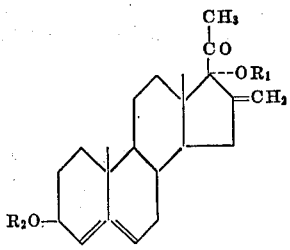

wherein $R_1$ and $R_2$ designate the same or different lower aliphatic acyl radicals containing up to 6 carbon atoms. Preferably, $R_1$ and $R_2$ are hydrocarbon acyl radicals such as acetyl, propionyl, capronyl.

The enolacylates of the above formula may be prepared from the corresponding 3-keto-4-pregnenes by treatment with lower aliphatic enolacylating agents. This reaction is carried out in the usual way. Thus, preferably a mixture of a lower aliphatic carboxylic acid chloride and a lower aliphatic carboxylic acid anhydride is used. If desired, the reaction may be performed in the presence of an organic base such as pyridine. Likewise, the enolacylation may be carried out by using a mixture of a carboxylic acid anhydride and an organic base such as pyridine. In these reactions, it is not absolutely necessary to add a solvent, as the starting materials dissolve in the mixtures used as enolacylating agents.

The temperatures during the reaction vary between room temperature and the boiling point of the enolacylating agent. Dependent on the reaction temperatures, the reactions take from about 2 hours to 2 days.

Furthermore, it is possible to use the well known isopropenyl acetate as enolacylating agent. In this case, usually a solvent such as benzene, toluene or xylene is employed. It is advisable to add an acid catalyst in this reaction, for example, small amounts of paratoluene sulfonic acid. Still other enolacylating agents may be employed, such as ketenes.

As starting materials, there can be used the 17-acylates, especially the 17-acetate, of 16-methylene-17α-hydroxy-progesterone as well as the latter compound itself. In the latter case, the 17α-hydroxy group is esterified in the course of the enolacylation. The preparation of 16-methylene-17α-hydroxy-progesterone and its acetate is disclosed in Tetrahedron Letters No. 16, pages 21–32 (1960); the other starting compounds can be made from the 16-methylene-17α-hydroxy-progesterone by conventional acylation methods.

According to this invention, the following are the preferred 3-enolacylates:

16-methylene-3,5-pregnadiene-20-one-3,17α-diol-3-butyrate-17-acetate;
16-methylene-3,5-pregnadiene-20-one-3,17α-diol-3,17-diacetate;
16-methylene-3,5-pregnadiene-20-one-3,17α-diol-3-propionate-17-acetate;
16-methylene-3,5-pregnadiene-20-one-3,17α-diol-3-valerate-17-acetate; and
16-methylene-3,5-pregnadiene-20-one-3,17α-diol-3-3acetate-17-capronate.

The new 3-enolacylates according to this invention exhibit a strong anti-phlogistic activity. They are to be used, for example, as topical antiphlogistica in preferably flowable preparations. For example, they can be incorporated into the usual bases of ointments, salves, creams and emulsions. All commonly used ingredients, carriers, and additives may be used such as fats, saturated and unsaturated fatty acids, higher alcohols, waxes, aliphatic hydrocarbons, aromatic carboxylic acids, glycols such as glycerol, propylene glycol or polyethylene glycols, wool wax, wool wax alcohols, ionic and non-ionic emulsifiers or detergents, volatile oils, odorants, vitamins, compounds stimulating skin circulation, etc.

In general, the pharmaceutical preparations according to this invention contain about 0.1 to 5%, preferably 1%, of the active ingredient. Of course, other active compounds may be added, if desired, if they are compatible with the new steroids of this invention.

Without further elaboration, it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

(A) PROCESSES FOR THE PREPARATION

Example 1

1 g. of 16-methylene-4-pregnene-3,20-dione-17α-ol-17-acetate is heated for 3 hours at 100° C. with 5 cc. of acetic acid anhydride and 1 cc. of acetyl chloride. Then the reaction mixture is concentrated under reduced pressure. The 16-methylene-3,5-pregnadiene-20-one-3,17α-diol-diacetate crystallized from ether exhibits the following properties: M.P. 174–177° C.; $\lambda_{max}$, 235–236 mμ, ε 20,800; $[\alpha]_D^{20}$ −144° (chloroform).

Example 2

7 g. of 16-methylene-17α-hydroxy-progesterone-17-capronate are heated in an oil bath for 3 hours at 100° C. in the absence of moisture with 112.5 cc. of acetic acid anhydride, 44.8 cc. of acetyl chloride and 4.5 cc. of pyridine. The reaction mixture is evaporated to dryness under reduced pressure. The 16-methylene-3,5-pregnadiene-3,17α-diol-20-one-3-acetate-17-capronate crystallized from methanol exhibits the following properties; M.P. 78–80° C.;

$\lambda_{max}$, 235 mμ, $E_{1cm}^{1\%}$ 381; $[\alpha]_D^{20}$ −178° (chloroform)

Example 3

4 g. of 16-methylene-17α-acetoxy-progesterone are heated in an oil bath for 3 hours to 100° C. with 80 cc. of butyric acid anhydride, 40 cc. of butyryl chloride and 4 cc. of pyridine. The reaction mixture is worked up as described in Example 2. The 16-methylene-3,5- pregnadiene-3,17α-diol-20-one-3-butyrate-17-acetate crystallized from methanol yields the following properties:

$$\lambda_{max}. 235.5 \ m\mu, \ E_{1cm.}^{1\%} \ 492$$

(B) PHARMACEUTICAL PREPARATIONS

*Example 4*

OINTMENT

| | G. |
|---|---|
| 16-methylene-3,5-pregnadiene - 3,17α - diol-20-one-diacetate | 1.0 |
| Cetyl alcohol | 2.4 |
| Wool wax alcohols | 5.0 |
| Yellow petroleum jelly | 10.0 |
| Solid paraffin | 22.0 |
| Viscous paraffin | 60.0 |

*Example 5*

OINTMENT

| | G. |
|---|---|
| 16 - methylene-3,5-pregnadiene-3,17α-diol - 20 - one-3-acetate-17-capronate | 1.0 |
| Polyethylene glycol 400 monostearate | 20.0 |
| Polyethylene glycol 400 | 40.0 |
| Polyethylene glycol 4000 | 39.0 |

*Example 6*

CREAM

| | G. |
|---|---|
| 16-methylene - 3,5 - pregnadiene-3,17α-diol-20-one-3-propionate-17-acetate | 1.0 |
| Cetyl alcohol | 10.0 |
| White wax | 2.5 |
| Sodium laurylsulfonate | 1.0 |
| Glycerol monostearate | 2.0 |
| Water | 84.0 |

*Example 7*

CREAM

| | G. |
|---|---|
| 16-methylene-3,5-pregnadiene - 3,17α - diol-20-one-diacetate | 1.0 |
| Cetyl alcohol | 10.0 |
| White Vaseline | 5.0 |
| Viscous paraffin | 10.0 |
| Glycerol monostearate | 2.0 |
| Glycerol | 10.0 |
| Polyoxyethylene-sorbitan-monostearate | 5.0 |
| Water | 57.0 |

*Example 8*

CREAM

| | G. |
|---|---|
| 16-methylene-3,5-pregnadiene-3,17α-diol-20-one - diacetate | 2.0 |
| Stearic acid | 25.0 |
| Glycerol | 10.0 |
| Triethanolamine | 1.43 |
| Water with preservative | 62.0 |

*Example 9*

LINIMENT (a)

| | Parts |
|---|---|
| 16-methylene-3,5-pregnadiene-3,17α-diol-20 - one - 3-acetate-17-capronate | 0.5 |
| Glycerol monostearate | 4 |
| Liquid lanoline | 3 |
| Liquid paraffin | 5 |
| Isopropyl myristate | 10 |
| Polyoxyethylene sorbitan-monooleate | 2 |

(b)

| | |
|---|---|
| Propylene glycol | 6 |
| Water | 20 |
| Preservative, q.s. | |

The ingredients listed under (a) are melted together. The substances mentioned under (b) are mixed and likewise heated to about 70° C. Then the two mixtures are combined; when the mixture has cooled to about 50° C., 35 parts of an aqueous bentonite suspension (2% by weight) are added with stirring. Stirring is continued until the mixture has cooled to room temperature.

*Example 10*

A solution of 10 g. of 16-methylene-3,5-pregnadiene-3,17α-diol-20-one-diacetate in 25 g. of castor oil is added with stirring to a mixture of

| | G. |
|---|---|
| Olive oil (preserved) | 390 |
| Peanut oil (preserved) | 350 |
| Isopropyl myristate | 235 |

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed as this invention is:

1. A pharmaceutical preparation in viscous to semi-solid form for topical administration, comprising an intimate mixture of an active compound of the formula

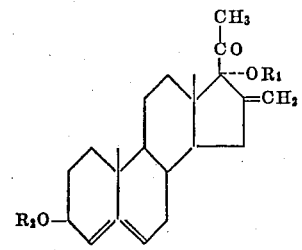

wherein $R_1$ and $R_2$ each designates alkanoyl of up to 6 carbon atoms, together with a pharmaceutically acceptable carrier, said active compound being present in a concentration of about 0.1 to 5% by weight of the total pharmaceutical preparation.

2. The pharmaceutical preparation of claim 1 wherein 16-methylene-3,5-pregnadiene-20-one-3,17α - diol - diacetate is the active compound.

3. A method of effecting anti-phlogistic activities in mammals, which method comprises topically administering an effective dosage of a compound of the formula

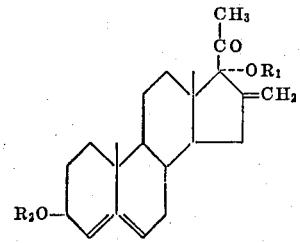

wherein $R_1$ and $R_2$ each represents alkanoyl of up to 6 carbon atoms.

4. The method of claim 3 wherein both $R_1$ and $R_2$ represent acetyl.

5. A pharmaceutical preparation as defined in claim 1, said preparation being an ointment.

6. A pharmaceutical preparation as defined in claim 1, said preparation being a cream.

7. A pharmaceutical preparation as defined in claim 1, said preparation being a liniment.

8. A pharmaceutical preparation as defined in claim 1 wherein said pharmaceutically acceptable carrier comprises a substantial amount of a viscous to solid substance selected from the group consisting of a fatty acid, an ester of a fatty acid, a higher aliphatic alcohol, a wax, an aliphatic hydrocarbon, an aromatic carboxylic acid, a glycol, and mixtures thereof.

References Cited by the Examiner
UNITED STATES PATENTS 3,040,035   6/62   Petrow et al. _____ 260—239.55

OTHER REFERENCES

Shapiro et al.: "Journal Med & Pharm. Chem.," September 1962, pages 975–988.

LEWIS GOTTS, *Primary Examiner.*